US010954054B2

(12) United States Patent
Deng et al.

(10) Patent No.: US 10,954,054 B2
(45) Date of Patent: Mar. 23, 2021

(54) THERMOFORMABLE COPOLYESTER LAMINATE

(71) Applicant: DuPont Teijin Films U.S. Limited Partnership, Wilmington, DE (US)

(72) Inventors: Fenghua Deng, Richmond, VA (US); Peter N. Nugara, Richmond, VA (US); Stephen K. Franzyshen, Richmond, VA (US); Reps M. Haskins, Midlothian, VA (US)

(73) Assignee: DUPONT TEIJIN FILMS U.S. LIMITED PARTNERSHIP, Wilmington, DE (US)

( * ) Notice: Subject to any disclaimer, the term of this patent is extended or adjusted under 35 U.S.C. 154(b) by 0 days.

(21) Appl. No.: 15/980,843

(22) Filed: May 16, 2018

(65) Prior Publication Data

US 2018/0257842 A1    Sep. 13, 2018

Related U.S. Application Data

(62) Division of application No. 13/822,886, filed as application No. PCT/US2011/051346 on Sep. 13, 2011, now abandoned.

(60) Provisional application No. 61/382,658, filed on Sep. 14, 2010.

(51) Int. Cl.
| | |
|---|---|
| B65D 81/34 | (2006.01) |
| B32B 27/08 | (2006.01) |
| B32B 27/36 | (2006.01) |
| B32B 27/30 | (2006.01) |
| B32B 27/34 | (2006.01) |
| B32B 1/02 | (2006.01) |
| B65B 1/02 | (2006.01) |

(52) U.S. Cl.
CPC ............... *B65D 81/34* (2013.01); *B32B 1/02* (2013.01); *B32B 27/08* (2013.01); *B32B 27/304* (2013.01); *B32B 27/34* (2013.01); *B32B 27/36* (2013.01); *B65B 1/02* (2013.01); *B32B 2307/306* (2013.01); *B32B 2307/31* (2013.01); *B32B 2307/738* (2013.01); *B32B 2439/70* (2013.01); *Y10T 428/1334* (2015.01); *Y10T 428/31736* (2015.04); *Y10T 428/31739* (2015.04); *Y10T 428/31786* (2015.04); *Y10T 428/31797* (2015.04)

(58) Field of Classification Search
CPC ......... B65D 81/34; B32B 27/34; B32B 27/08; B32B 27/36; B32B 27/304; B32B 1/02; B32B 2307/306; B32B 2307/31; B32B 2307/738; B32B 2439/70; B65B 1/02; Y10T 428/1334; Y10T 428/31797; Y10T 428/31736; Y10T 428/31786; Y10T 428/31739

See application file for complete search history.

(56) References Cited

U.S. PATENT DOCUMENTS

| | | | |
|---|---|---|---|
| 4,940,634 A | 7/1990 | Mueller et al. | |
| 7,332,564 B2 | 2/2008 | Fujimori et al. | |
| 7,432,324 B2 | 10/2008 | Chen et al. | |
| 7,569,276 B2 * | 8/2009 | Kendig | B32B 27/36 |
| | | | 428/423.7 |
| 7,638,578 B2 | 12/2009 | Chen et al. | |
| 7,834,128 B2 | 11/2010 | Fujimori et al. | |
| 8,507,084 B2 | 8/2013 | Deng | |
| 2001/0055671 A1 | 12/2001 | Pickett et al. | |
| 2002/0090476 A1 | 7/2002 | Ling et al. | |
| 2005/0158499 A1 | 7/2005 | Ling et al. | |
| 2009/0130276 A1 | 5/2009 | Voisin et al. | |
| 2010/0021391 A1 | 1/2010 | Douglas et al. | |
| 2010/0068355 A1 | 3/2010 | Berry et al. | |
| 2013/0236612 A1 | 9/2013 | Deng et al. | |

FOREIGN PATENT DOCUMENTS

| | | |
|---|---|---|
| CN | 1898086 A | 1/2007 |
| CN | 101563405 A | 10/2009 |

(Continued)

OTHER PUBLICATIONS

Chinese Office Action for Chinese Application No. 201180049801.1, dated Jul. 2, 2014, with English translation—18 pages.

(Continued)

*Primary Examiner* — Eli D. Strah
(74) *Attorney, Agent, or Firm* — RatnerPrestia

(57) ABSTRACT

A laminate includes the following substantially coextensive layers in the following order: (a) a non-sealable, self-supporting, thermoformable copolyester film layer having a first surface and a second surface, the second surface constituting an outermost, exposed surface of the laminate; (b) a laminating adhesive layer on the first surface of the thermoformable copolyester film layer; and (c) a self-supporting, thermoformable structural film layer having a first surface and a second surface, the first surface contacting the laminating adhesive layer. Polyethylene terephthalate constitutes at least 80% by weight of the self-supporting thermoformable copolyester film layer; the thermoformable structural film layer includes a polymer selected from the group consisting of polyamides, polypropylene, polyethylene, polyethylene terephthalate, ionomers, ethylene acrylic acid copolymers, ethylene vinyl acetate copolymers, polystyrene, ethylene vinyl alcohol copolymers and polyvinylidene chloride; the thermoformable copolyester film layer, the structural film layer and the laminate each shrink less than 5% in length and width upon exposure to boiling water for five seconds; and the laminate is thermoformable and its chloroform-soluble extractives meet the requirements of paragraph h(1) of 21 CFR § 177.1630 as defined herein.

17 Claims, No Drawings

(56) References Cited

FOREIGN PATENT DOCUMENTS

| | | | |
|---|---|---|---|
| EP | 1395337 A1 | 3/2004 | |
| EP | 1396337 A1 * | 3/2004 | ............. B32B 27/08 |
| EP | 1574328 A1 | 9/2005 | |
| JP | 2004148804 A1 | 5/2004 | |
| JP | 2007517685 A | 7/2007 | |
| KR | 20090078348 A | 7/2009 | |
| WO | 2005063483 A1 | 7/2005 | |
| WO | 2007054698 A3 | 5/2007 | |
| WO | 2008008381 A2 | 1/2008 | |
| WO | WO-2008053205 A1 * | 5/2008 | ............... B32B 1/02 |
| WO | 2009032627 A2 | 3/2009 | |
| WO | WO-2009032627 A3 * | 4/2010 | ............ B32B 27/36 |

OTHER PUBLICATIONS

European Communication for European Application No. 11 760 648.3, dated Mar. 27, 2017—4 pages.
European Office Action for European Application No. 11 760 648.3, dated Jun. 17, 2016—5 pages.
International Preliminary Report on Patentability for International Application No. PCT/US2011/051346, dated Oct. 24, 2012—13 pages.
International Search Report and Written Opinion for International Application No. PCT/US2011/051346, dated Nov. 24, 2011—9 pages.
Japanese Office Action for Japanese Application No. 2013-529259, dated Jul. 8. 2015, with English translation—10 pages.
English Translation of Mexican Office Action for Application No. MX/a/2013/002695, dated Mar. 25, 2015—4 pages.
Mexican Office Action for Application No. MX/a/2013/002695, with English translation, dated Nov. 18, 2015—11 pages.
Mexican Office Action for Application No. MX/a/2013/002695, dated Oct. 14, 2014—1 page.
Mexican Office Action for Application No. MX/a/2013/002695, dated May 27, 2016—9 pages.
Notification of Reasons for Refusal for Korean Application No. 10-2013-7009266, with English translation, dated Dec. 18. 2017—6 pages.
Second Chinese Office Action for Application No. 201180049801.1, with English translation, dated Feb. 16, 2015—4 pages.
Entire patent prosecution history of U.S. Appl. No. 13/822,886, filed May 30, 2013, entitled "Thermoformable Copolyester Laminate."
Indian Office Action for Indian Application No. 2314/DELNP/2013, dated Sep. 10, 2018, with translation, 5 pages.
Korean Notice of Final Rejection for Korean Application No. 10-2013-7009266, dated Jul. 11, 2018 with translation, 7 pages.
Ferry, "Viscoelastic Properties of Polymers", 3rd Edition, John Wiley & Sons, Inc., 1980, 6 pages.
Ward et al., "An Introduction to the Mechanical Properties of Solid Polymers", 2nd Edition, John Wiley & Sons, 2002, 11 pages.
Brazilian Search Report and Written Opinion for International Application No. BR112013005947-8, dated Aug. 1, 2019, 4 pages.
Brazilian Examination Report for Brazilian Application No. BR 11 2013 005947-8, dated Mar. 9, 2020, with translation, 16 pages.
Brazilian Examination Report for Brazilian Application No. 112013005947-8, dated Jul. 22, 2020, 8 pages.

* cited by examiner

THERMOFORMABLE COPOLYESTER LAMINATE

This application is a divisional of U.S. patent application Ser. No. 13/822,886, filed May 30, 2013, which is the national phase application under 35 U.S.C. 371 of International Application No. PCT/US2011/051346, filed Sep. 13, 2011, and claims priority to U.S. Provisional Patent Application No. 61/382,658, filed Sep. 14, 2010, the entireties of which are incorporated herein by reference for all purposes.

BACKGROUND OF THE INVENTION

Articles such as food items and more specifically meat, poultry and seafood products are often packaged in thermoplastic films or laminates to protect the product from exterior abuse and environmental contamination, and to provide a convenient and durable package for distribution of the product and display in a display case or other point of sale. Packages made from films that are formed, filled with product and sealed exist in many shapes and forms for many applications, and are commonly used for such packaging. When dealing with meat products in particular, it is usually desirable to provide a film having good oxygen barrier characteristics, in order to reduce the passage of oxygen through the film so that detrimental effects on freshness, color, and other properties of the meat product are minimized.

In many cases it is desirable to provide a package that can be used to cook the contained foodstuff without removing the packaging material (a "cook-in" package). It is also desirable that such packages be suitable for heating or cooking in conventional, convection or microwave ovens ("dual-ovenable") or for heating in boiling water. It is particularly convenient to be able to purchase a fresh, partially, or fully cooked or value-added foodstuff in a package at the retail level and merely insert the package directly into a conventional or microwave oven and cook and reheat the foodstuff.

Thermoforming methods such as vacuum forming or plug-assist vacuum forming are often used to produce suitable packages. In general terms, thermoforming involves heating a thermoplastic film or laminate and forming it into a shape suitable for containing the product, which is subsequently inserted. The film or laminate is sometimes referred to as a "forming web", and the package is closed with a "capping web" film that is adhered to the thermoformed package.

Coextruded films comprising polyolefins such as polyethylene are sometimes useful in producing thermoformed packages. Laminate films have also been employed. For example, US. Pat. No. 4,940,634 discloses biaxially oriented thermoplastic composite films comprising polyolefins, suitable for use as forming webs in thermoforming operations. It is common practice to join the capping web to the, thermoformed package by heat-sealing the two together. Each film accordingly has a heat-sealable layer on its surface, or consists entirely of a heat-sealable polymer. The two films are pressed together with heating to effect the bond.

However, films comprising polyolefins generally do not possess high temperature heat resistance, which limits their application to microwave cooking or reheating. On the other hand, polyethylene terephthalate (PET) films have high heat resistance, making them suitable for cook-in uses, but PET itself is not heat-sealable except at exceptionally high temperatures. If a heat-seal layer is provided on both PET surfaces, an acceptable seal can be obtained, but this adds time and expense to the film manufacturing' process. However, if one attempts to heat-seal a PET film having a heat-seal adhesive layer to a typical polyester film having no heat-seal adhesive layer, the bond strength is unacceptably weak for most applications. The need to provide a heat-seal layer on both film surfaces adds time and expense to the film manufacturing process Thus, it would be advantageous to provide a thermoformabie polyester film that does not bear a separate heat-seal layer, but that is nonetheless capable of being effectively heat-sealed to a polyester capping web that does.

SUMMARY OF THE INVENTION

In one aspect, the invention provides a laminate including the following substantially coextensive layers in the following order:

(a) a non-sealable, self-supporting, thermoformable copolyester film layer having a first surface and a second surface, the second surface constituting an outermost, exposed surface of the laminate;

(b) a laminating adhesive layer on the first surface of the thermoformable copolyester film layer; and (c) a self-supporting, thermoformable structural film layer having a first surface and a second surface, the first surface contacting the laminating adhesive layer.

Polyethylene terephthalate constitutes at least 80% by weight of the self-supporting thermoformable copolyester film layer;

the thermoformable structural film layer includes a polymer selected from the group consisting of polyamides, polypropylene, polyethylene, polyethylene terephthalate, ionomers, ethylene acrylic acid copolymers, ethylene vinyl acetate copolymers, polystyrene, ethylene vinyl alcohol copolymers and polyvinylidene chloride;

the thermoformable copolyester film layer, the structural film layer and the laminate each shrink less than 5% in length and width upon exposure to boiling water for five seconds; and the laminate is thermoformable and its chloroform-soluble extractives meet the requirements of paragraph h(1) of 21 CFR § 177.1630 as defined herein.

In another aspect, the invention provides a package including a laminate as described above, wherein the laminate is in the shape of a thermoformed receptacle having a pocket with a flange and an opening, the second surface of the copolyester film layer forming an inner surface of the pocket and a mating surface of the flange, and a heat-sealable film. The opening of the receptacle is closed by the heat-sealable film, which includes a self-supporting polymeric film having on a surface thereof a substantially coextensive heat-seal layer. The heat-seal layer of the heat-sealable film is in contact with and bonded to the mating surface of the flange of the thermoformed receptacle, and chloroform-soluble extractives of the heat-sealable film meet the requirements of paragraph h(1) of 21 CFR § 177.1630 as defined herein.

In yet another aspect, the invention provides a method of packaging a foodstuff, including placing the foodstuff in the pocket of the laminate as described above and subsequently sealing the opening by heat-sealing a film to the flange.

DETAILED DESCRIPTION OF THE INVENTION

Laminates according to the invention include a non-sealable thermoformable copolyester film layer on a surface of the laminate, bonded by a laminating adhesive to a thermoformable structural film layer. As used herein, the term "non-sealable" means that attempts to bond two like pieces of the material together by heat-sealing using the test method specified in the Examples fail to produce a bond strength of at least 200 g/25 mm. While the copolyester face of such a laminate is not itself heat-sealable, it is receptive to heat-sealing, meaning that another film having a heat-sealable surface layer can form a strong bond to the copolyester face of the inventive film under heat-sealing conditions.

Laminates according to the invention meet the requirements of paragraph h(1) of 21 CFR § 177.1630 dated Apr. 1, 2003, incorporated herein as Appendix A, and are dual-ovenable. Laminates and multilayer films described herein will be understood to have all of the layers mutually coextensive, unless the context makes it clear otherwise. Each of the layers of the laminate will now be described in detail, followed by a description of the structure and use of suitable capping webs that may be used to seal thermoformed packages made from the laminates.

Thermoformable Copolyester Film Layer

Thermoforming comprises heating a film to a temperature ($T_1$) above the glass transition temperature ($T_g$) of the material but below the crystalline melting temperature ($T_m$) of the material (if it has a crystalline component), and then applying a deforming force to the material while it is in its softened, rubbery, solid state. The film is then cooled to a temperature below its glass transition temperature, and it must retain the deformation that was introduced while it was in the softened rubbery state.

In addition, the elongation (strain) at break (ETB) should be greater than the strains experienced during the thermoforming operation, and the tensile strength at maximum elongation (UTS) should be greater than the yield stress.

Thermoformability requires that the deformed film retains the deformed shape, once cooled. Accordingly, an important characteristic of a thermoformable film is relaxation of induced stress at the processing temperature after stretching the film to the desired strain. This characteristic is usually expressed as a percentage of stress retained after a defined time period (in seconds), or as the time required to relax stress by a defined percentage, and in a thermoformable film the values of these parameters should be as low as possible, as is well known in the art (see for instance "Viscoelastic Properties of Polymers"; John D. Ferry, page 8 et seq., 3rd Ed, Wiley, NY; ISBN 0-471-04894-1; and "Mechanical Properties of Solid Polymers", I. M. Ward, $2^{nd}$ Ed., John Wiley)).

For purposes of this invention, a film or laminate will be considered thermoformable if the elongation (strain) at break when measured at 130° C. is greater than 220% in both machine (MD) and transverse (TD) directions.

The thermoformable copolyester film layer is partially amorphous, with the result that shrinkage of the layer (prior to any thermoforming) is typically very low upon heating. Typically the shrinkage is less than 5%, more typically less than 3%, in both the machine (MD) and transverse (TD) directions (i.e., in both length and width). The ability of the layer to be thermoformed without substantial shrinkage is important, because excessive shrinkage may lead to forming difficulties such as loss of ability to maintain grip on the film during the forming step.

The crystallinity percentage indirectly gives a measure of the amorphous content of the polymer, with lower crystallinity meaning higher amorphous content, which in turn may give an indication of the ability of a film to thermoform. In some embodiments, the thermoformable copolyester has a crystallinity percentage below about 50%, more preferably below about 45%, more preferably in the range from 5 to about 42%, more preferably in the range from 3 to about 40%.

The thermoformable copolyester film layer is a self-supporting film or sheet, by which is meant a film or sheet capable of independent existence in the absence of a supporting base. A film-forming thermoplastic copolyester resin constitutes the major component of the thermoformable copolyester film layer, and makes up at least 50%, preferably at least 65%, preferably at least 80%, preferably at least 90%, and preferably at least 95% by weight of the total weight of the layer. Typically, one or more fillers may make up the balance of the layer. In some cases, the layer consists of the film-forming thermoplastic copolyester resin.

The synthetic linear copolyesters useful for the thermoformable copolyester film layer may be obtained by condensing the dicarboxylic acids or their lower alkyl diesters, e.g. terephthalic acid (TA), isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, e.g. ethylene glycol, 1,3-propanediol, 1,4-butanediol, neopentyl glycol, 1,4-cyclohexanedimethanol and diethylene glycol. In general, suitable glycols are of low molecular weight (i.e. below about 250), and in some embodiments it is desirable to avoid the use of glycols having an average molecular weight of over 250, such as poly(alkylene oxide) glycols. Aliphatic glycols are preferred, particularly ethylene glycol. In some embodiments, diethylene glycol constitutes at least 1.5 mol % of the total diol, or at least 2 mol %, with the balance being ethylene glycol. In some embodiments, at most 5 mol % is diethylene glycol, or at most 3.5%.

The copolyester contains at least one aromatic dicarboxylic acid, preferably selected from the aromatic dicarboxylic acids noted above, and preferably said at least one aromatic dicarboxylic acid is TA. In one embodiment, the copolyester contains only one aromatic dicarboxylic acid, which is preferably TA. In some embodiments, it is desirable to avoid the use of dicarboxylic acid monomers that are sulphonated, i.e. dicarboxylic acids containing a sulphonic acid group or salt thereof (i.e. dicarboxylic acids which contain an —$SO_3X$ moiety where X is H or an alkali metal, such as sodium sulfo-isophthalate).

The copolyester further contains at least one (typically only one) saturated aliphatic dicarboxylic acid of the general formula $C_nH_{2n}(COOH)_2$ wherein n is 2 to 8, such as azelaic acid. In one embodiment, the dicarboxylic acid fraction of the copolyester of the thermoformable copolyester film layer consists of at least one (and preferably only one) aromatic dicarboxylic acid, as defined above, and at least one (and preferably only one) aliphatic dicarboxylic acid, as defined above.

Preferably, the copolyester comprises at least 90 mol % relative to the total diacid fraction of the copolyester of an aromatic dicarboxylic acid, with the remainder being an aliphatic dicarboxylic acid. More typically, the amount is at least 92 mol %. Typically, at most 97 mol % of the total diacid is aromatic, more typically at most 95 mol %.

The thermoformable copolyester film layer may contain recycle material up to a level of 50% by weight of the layer, and preferably at least 10%, preferably at least 25%, and more preferably at least 40% by weight of the layer. By "recycle material", we mean waste material consisting of the composite film of the present invention, and such waste material may be derived from edge-trimming (typically the edge portions of the film which are held by the stenter clips during film manufacture), from excess film left over after the film has been slit along its longitudinal dimension, from start-up film (i.e. the film produced at the start of a manufacturing run), or from film that has been failed for other reasons, as is well-known in the art. It is surprising that recycle material may be used in the thermoformable copolyester film layer in such high proportions given that it contains the wax from the heat-sealable layer without causing problems in the film making process.

The thermoformable copolyester film layer may comprise one or more discrete coextruded sublayers of the above film-forming materials. The polymeric materials of the respective sublayers may be the same or different. For instance, the thermoformable copolyester film layer may comprise one, two, three, four or five or more sublayers, and typical multi-layer structures may be of the AB, ABA, ABC, ABAB, ABABA or ABCBA type. Preferably, the thermoformable copolyester film layer is monolithic and comprises only one layer, i.e., multiple coextruded copolyester layers are not present. The thermoformable copolyester layer typically has a thickness in a range from 0.5 mil to 4 mil, depending on the desired end structure. It can be unoriented, but typically it is biaxially oriented.

Laminates according to the invention are capable of forming a heat-seal bond (on the thermoformable copolyester side) to a capping web with a bond strength typically of at least 250 g/25 mm, and more typically at least 400 g/25 mm, when measured as described in the Examples, using MYLAR® OL13 film (DuPont Teijin Films, Richmond, Va.) as the capping web. The heat-seal bond strength will typically be at most 2500 g/25 mm, and more typically at most 1000 g/25 mm. Packages according to the invention may use capping webs other than MYLAR® OL13 film, but the ranges of heat-seal bond strengths between the laminate and the capping web will still fall within the ranges described above. As noted earlier, the thermoformable copolyester film layer of laminates according to the invention is itself nonsealable, meaning that when bonded to itself the heat-seal strength is less than 200 g/25 mm when measured as described in the Examples.

Laminating Adhesive Layer

The thermoformable copolyester layer is laminated to the structural film layer by use of a laminating adhesive, which may for example be a polyester urethane. The adhesive may typically be applied as a solution.

Solvent-based adhesives can be applied to one side (or two sides) of the base sheet by any means known to those of skill in the art. For example, the film may be coated by roller (e.g. doctor roll) coating, spray coating, gravure coating, or slot coating, preferably roller or gravure coating using a solution coating process.

For example, a two-part polyester urethane adhesive can be applied to the thermoformable PET via a gravure cylinder to serve as the laminating adhesive. The laminating adhesive is applied across the web from solution. Removal of any solvent may require the application of heat. The two film layers are then laminated using standard laminating conditions.

The laminating adhesive may also be "solventless." Solventless laminating adhesives are well known in the art and illustratively include waterborne acrylic emulsions, polyurethane dispersions and one and two part polyurethane systems with 100% solids. Waterborne systems require dryers after adhesive application at elevated temperatures to eliminate the water before combining with another substrate. On the other hand, polyurethane systems with 100% solids rely on a chemical reaction for curing and little or no heat is required. In some applications it is preferred that the laminating adhesive be elastomeric, with exemplary embodiments being polyurethanes.

The laminating adhesive can be applied either to the thermoformable copolyester film layer or the structural film layer, or both. One or both of these films may also be surface treated, such as by corona. In some cases both surfaces may be corona treated prior to application of an adhesive in order to promote better bonding between the film surfaces in contact with the applied adhesive. The laminating adhesive can be applied by well known coating techniques such as metering a low viscosity adhesive onto a multiple application roll system configuration that applies the adhesive to a first web or substrate. The first web is then mated to a second web or substrate by use of a heated nip roll.

Thermosetting compositions may also be used for the laminating adhesive. One such adhesive consists of equal parts by volume of MOR-FREE™ 225 polyester polyol and MOR-FREE™ C-33 isocyanate, both available from Rohm and Haas of Spring House, Pa. Other examples include solvent adhesives such as ADCOTE™ 812 and ADCOTE™ 811B or a mixture of ADCOTE™ 250HV and Coreactant 86, all available from Rohm and Haas of Spring House, Pa. The laminating layer typically has a thickness in a range from 0.5 mil to 10 mil including the thickness of the adhesive layer.

Thermoformable Structural Film Layer

The thermoformable copolyester film layer is adhesively laminated to a thermoformable structural film layer to enhance performance of the overall structure, depending on the packaging need and intended condition of use. Examples of polymeric films useful for the structural film layer are polyamide (for example, nylon), polypropylene, polyethylene, ionomer, ethylene acrylic acid copolymer, ethylene vinyl acetate copolymer, polyethylene terephthalate, polystyrene, ethylene vinyl alcohol and polyvinylidene chloride. One exemplary ionomer is sold by E.I. du Pont de Nemours and Company, Wilmington, Del. (DuPont) under the trade name SURLYN®.

In some embodiments, the layer may be an abuse layer comprising oriented polyamide (nylon). This layer is preferably unaffected by the sealing temperatures used to make the package. The thickness of this layer can control the stiffness of the package, and may be in a range from about 10 to about 250 μm (0.4 to 10 mils), typically in a range from 50 to 200 μm (2 to 8 mils). This layer may be provided with graphic elements such as printing and embossing to provide information for the consumer and/or a pleasing appearance to the package. Preferably this layer is reverse printable. The particular film used will in part depend upon the end use of the package. For example, packages containing bones or other hard projections will require thicker film laminate structures. The thickness of the laminate structure will also depend on the depth of the draw desired during thermoforming. A preferred material for the strength layers is a polyamide such as biaxially oriented nylon from about 0.5 mil to about 5 mils in thickness. Nylon used as an outer layer can be from about 1 to 5 mils thick. Nylon used as an inner layer in combination with another layer can be from about 0.5 to 10 mils thick.

Polyamides suitable for use in making the structural film layer include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are nylon 6,6; nylon 6; nylon 6.66; nylon 6,10; and blends and mixtures thereof. Nylon 6,6 is commercially available, for example, under the trade name DARTEK® from Exopack Performance Films Inc., Whitby, Canada. Nylon 6 is commercially available, for example, under the trade name Nylon 4.12 from DuPont. Nylon 6.66 is commercially available under the trade names "ULTRAMID® C4" and "ULTRAMID® C35" from BASF, or under the trade name "UBE 5033FXD27" from Ube Industries Ltd. Heat stabilizer-modified version of the above nylons, and blends and mixtures of the nylons, may also be used.

The laminates of this invention comply with the requirements of paragraph h(1) of 21 CFR § 177.1630 dated Apr. 1, 2003. This paragraph requires that the food contact surface, when exposed to distilled water at 250° F. (121° C.) for 2 hours, yields chloroform-soluble extractives not to exceed 0.02 mg/in$^2$ (0.0031 mg/cm$^2$) of food contact surface exposed to the solvent; and that the food contact surface, when exposed to n-heptane at 150° F. (66° C.) for 2 hours, yields chloroform-soluble extractives not to exceed 0.02 mg/in$^2$ (0.0031 mg/cm$^2$) of food contact surface exposed to the solvent.

Capping Web

Suitable capping webs comprise a heat-sealable polymer layer, either alone or on the surface of a substrate layer, and in use the heat-sealable layer is eventually heat-sealed to the laminate on its thermoformable copolyester surface. The substrate layer of the capping web (if present) is typically polymeric and may be monolithic, although other layers may be added on the side of the substrate layer opposite the heat-sealable polymer layer. A polymeric material is the major component of the heat-sealable layer, constituting at least 50%, preferably at least 65%, preferably at least 80%, preferably at least 90%, and preferably at least 95% by weight of the total weight of the heat-sealable layer. Typically, one or more tackifiers, antifog agents, etc. may make up the balance of the layer. In some cases, the heat-sealable layer consists of the polymeric material.

During heat-sealing, the polymeric material of the heat-sealable layer softens to a sufficient extent that its viscosity becomes low enough to allow adequate wetting for it to adhere to the surface to which it is being bonded. The heat-seal bond is effected by heating to soften the polymeric material of the heat-sealable layer without melting any of the other layers in either film, and applying pressure. Thus, the polymeric material of the heat-sealable layer should begin to soften at a temperature such that the heat-seal bond can be formed at a temperature which is less than the melting temperature of the polymeric material of the substrate. In one embodiment, the polymeric material of the heat-sealable layer should begin to soften at a temperature such that the heat-seal bond can be formed at a temperature which is between about 5 and 50° C. below, preferably between about 5 and 30° C. below, and preferably at least about 10° C. below the melting temperature of the polymer material of the substrate.

In a preferred embodiment, the heat-sealable layer comprises, and typically consists essentially of, a copolyester resin derived from at least one (and preferably only one) aromatic dicarboxylic acid and at least one (and preferably only one) aliphatic dicarboxylic acid (or their lower alkyl (i.e. up to 14 carbon atoms) diesters) with one or more glycol(s). Formation of the copolyester is conveniently effected in known manner by condensation, or ester-interchange, at temperatures generally up to 275° C.

Preferred aromatic dicarboxylic acids include terephthalic acid, isophthalic acid, phthalic acid, and 2,5-, 2,6- or 2,7-naphthalenedicarboxylic acid, and preferably the aromatic dicarboxylic acid is terephthalic acid. Preferred aliphatic dicarboxylic acids are saturated aliphatic dicarboxylic acids of the general formula $C_nH_{2n}(COOH)_2$ wherein n is 2 to 8, such as succinic acid, sebacic acid, adipic acid, azelaic acid, suberic acid or pimelic acid, preferably sebacic acid, adipic acid and azelaic acid, and more preferably azelaic acid. In one embodiment, the polyester contains no more than 90% of aromatic dicarboxylic acid (preferably TA) and at least 10% of aliphatic dicarboxylic acid, the percentages being the mole percentage of the total diacid content of the polyester, provided that the copolyester of the heat-sealable layer is of different composition than the substrate layer, as discussed hereinabove with regard to relative softening temperatures. Preferably, the concentration of the aromatic dicarboxylic acid present in the heat-sealable copolyester is no more than about 80 mole %, and preferably in the range from 45 to 80 mole %, more preferably 50 to 70 mole %, and particularly 55 to 65 mole % based on the dicarboxylic acid components of the copolyester. The concentration of the aliphatic dicarboxylic acid present in the heat-sealable copolyester is at least about 20 mole %, and preferably in the range from 20 to 55, more preferably 30 to 50, and particularly 35 to 45 mole % based on the dicarboxylic acid components of the copolyester. In some embodiments, it is desirable to avoid the use of dicarboxylic acid monomers that are sulphonated, i.e. dicarboxylic acids containing a sulphonic acid group or salt thereof (i.e. dicarboxylic acids which contain an —SO$_3$X moiety where X is H or an alkali metal, such as sodium sulfo-isophthalate).

Preferred glycols are aliphatic glycols, and more preferably alkylene glycols. Thus, suitable glycol(s) include aliphatic diols such as ethylene glycol, diethylene glycol, triethylene glycol, propylene glycol, 1,3-butanediol, 1,4-butanediol, 1,5-pentanediol, 2,2-dimethyl-1,3-propanediol, neopentyl glycol and 1,6-hexanediol. Ethylene glycol or 1,4-butanediol is preferred. Thus, the glycols are suitably low molecular weight diols (i.e. having a molecular weight below about 250). In some embodiments, it is desirable to avoid the use of glycols having an average molecular weight of over 250, such as poly(alkylene oxide) glycols. The copolyester of the heat-sealable layer is thus suitably a linear copolyester. The heat-sealable layer typically uses but a single polyester species, rather than a blend of different polyesters.

Preferably, the $T_g$ of the copolyester is no more than about 20° C., preferably no more than about 10° C., preferably no more than about 0° C., and preferably no more than about −20° C. In one embodiment, the melting point $T_m$ of the copolyester is preferably no more than about 160° C., preferably no more than about 150° C., more preferably no more than about 140° C., and preferably no more than about 130° C.

Particularly preferred examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of −40° C. and a melting point ($T_m$) of 117° C.), and a copolyester of azelaic acid/terephthalic acid/ethylene glycol (preferably having the components in the relative molar ratios of 40-50/60-50/100, more preferably 45/55/100) having a $T_g$ of −15° C. and a $T_m$ of 150° C. The heat-sealable layer typically has a thickness in a range from 0.5 mil to 2.0 mil (13 to 51 μm), depending on the desired end structure.

The substrate layer may consist of any of a wide variety of materials, including but not limited to biaxially oriented polyethylene terephthalate films, PET scrim, and Nylon films. One exemplary coextruded film suitable for use as a capping web comprises a clear, crystalline PET layer and an amorphous copolyester heat seal layer. A film of this type is available from DuPont Teijin Films under the trade name MYLAR® 851. The substrate layer typically has a thickness in a range from 0.5 mil to 2.0 mil (13 to 51 μm). The substrate layer may be unoriented, but preferably it is biaxially oriented.

Optionally, the capping web is surface printed or reverse printed (i.e. printed on a face that will be internal in the final film) to provide graphics, product information and the like. Printing is advantageously applied to the capping web, which is not subjected to thermoforming, so that the graphics are not distorted. Specific examples of capping webs including printed features include, from outermost layer to innermost layer: PVDC Coating/nylon/ink/adhesive/PET/heat-seal layer; Nylon/PVDC Coating/ink/adhesive/PET/heat-seal layer; or Nylon/ink/adhesive/PVDC Coating/PET/heat-seal layer. In these examples, the ink layer represents printed graphics that are applied to the second film prior to adhesive lamination, which may be effected with any of the laminating adhesives described earlier herein. For example, base films comprising oriented PET with an amorphous copolyester heat-seal layer can be adhesively laminated to a second film comprising a nylon layer and a PVDC barrier coating. The PVDC coating may also face the PET film.

Film Formation Processes

Films useful preparing the laminates or the capping webs may be made by virtually any method of film forming known to those skilled in this art. They may for example be cast, extruded, co-extruded, laminated and the like, including orientation (either uniaxially or biaxially) by various methodologies (e.g., blown film, mechanical stretching or the like). Various additives known to one skilled in the art can be present in the respective film layers including the presence of tie layers and the like. Additives include antioxidants and thermal stabilizers, ultraviolet (UV) light stabilizers, pigments and dyes, fillers, delustrants, anti-slip agents, plasticizers, anti-block agents, other processing aids, and the like.

Film manufacture can be carried out according to any known methods. It is possible, for example, to manufacture a primary film by extruding the compositions using so-called "blown film" or "flat die" methods. A blown film is made by extruding a polymeric composition through an annular die and expanding the resulting tubular film with an air current to provide a blown film. Cast flat films are made by extruding a composition through a flat die. The film leaving the die can be cooled by at least one roll containing internally circulating fluid (a chill roll) or by a water bath to provide a cast film.

A monolayer or multilayer film may be hot-blown from an extrusion die at a relatively high blow-up ratio. Suitable thermoplastic polyesters are preferably crystalline and of relatively high molecular weight to maintain film integrity during the blow-up procedure. The polyester can be stretched sufficiently during the hot blowing process to provide balanced orientation in both the longitudinal (machine) and transverse directions.

Alternatively, thermoplastic crystalline materials may be stretch oriented to obtain a biaxially oriented film. For example, a tubing is extruded and then cooled and reheated, and then stretched by, for example, a blown bubble process. This process is well known in the art. In the case of stretch-oriented materials, the tubing is being stretched and oriented at a relatively low temperature in comparison with the hot blown process disclosed above.

Thermoformed Laminate Package Sealed with Capping Web

The film laminate can be used in a myriad of applications such as to form packages using existing form, fill and seal (FFS) machines available from a number of manufacturers (e.g., Repak, Tiromat ULMA, and Multi-Vac). In a typical process, the laminate is thermoformed into the shape of a receptacle having a pocket with a flange and an opening, with the copolyester film layer forming an inner surface of the pocket and a mating surface of the flange. The heat-sealable layer of the capping web is sealed under vacuum to the flange to hermetically seal the package.

The packages may typically contain foodstuffs such as meat, poultry, seafood, non-meat products. Examples of foodstuffs that may be packaged in packages of this invention include processed meats such as sausages, hot dogs and the like. The foodstuffs also include value-added, seasoned, marinated and/or precooked meat products or prepared meals. The foodstuffs may also be whole-muscle and/or bone-in meat and poultry portions such as, for example but not limitation, pork loin, turkey or chicken breasts and the like. Poultry also includes ready-to-cook whole birds. Packages may also be used to enclose fresh meat, poultry and seafood in modified atmospheric packaging applications or vacuum packaging applications. The packages are dual-ovenable, and can be designed to self-vent during cooking as the heat-seal layer softens.

A preferred package of this invention consists essentially of (a) a thermoformable laminate disclosed herein and (b) a capping web, in which the capping web is heat sealed to the laminate after it has been thermoformed. Typically, the thermoformable laminate can be used to form pockets and then the pockets are filled with contents (for example, poultry) in an in-line packaging machine. The pockets can then be closed by heat sealing the margins of the laminate to a capping web in horizontal form, fill and seal applications such that the laminate and the capping web are hermetically sealed to each other.

Vent areas can be made anywhere on the package simply by providing a slit in the package face at the time of heating.

Packages made as described above are dual-ovenable, and may also be self-venting at typical cooking temperatures, depending on the choice of laminate and capping web. Self venting is a desirable safety feature to minimize the occurrence of steam blast on opening the package. In a conventional oven, once the sealant reaches its softening point and enough pressure is generated internally, the seal will rupture and vent the package. This venting also promotes air exchange for browning the meat if so desired. In another example, the sealant thickness and seal temperature can be designed to provide a vent (via rupture) once the foodstuff reaches 170° F. (76.7° C.). This may be useful when heating a foodstuff in a microwave, where the self-venting feature serves as a temperature indicator to show that the food is heated to the proper temperature and is ready for consumption.

One exemplary heat-seal polymer suitable for making seals that vent on heating is an amorphous copolyester. A coextruded film suitable for preparation of forming webs or capping webs that can be used in self-venting packages comprises a clear PET layer and an amorphous heat seal layer. Films of this type (having various thicknesses of clear PET and heat seal layer) are available from DuPont Teijin Films under the trade name MYLAR® OL.

In some embodiments, the package may vent when the temperature of the package reaches 150° F. (65.6° C.) to 450° F. (232.2° C.). In some embodiments, the package vents only at a temperature above 210° F. (98.9° C.), or only at a temperature above 250° F. (121.1° C.).

Packages according to the invention may incorporate other features such as perforations, tear zones and the like that facilitate opening the package. Polyamide and PET (heat sealable) combinations provide excellent directional tear properties in that a pre-notched package can be torn open in a straight line in either the machine direction or transverse direction. These tear properties provide greater flexibility in package configuration and design. Thus, the opening area to access the foodstuff after heating is not limited to a particular part (e.g. the top) of the package. This can allow for locating a notch at the side of the package in the desired area for opening.

EXAMPLES

The following test methods may be used to determine certain properties of the laminates of this invention, and packages made from them.

Heat-seal strength of the composite film to the capping web is measured as follows. The capping web is sealed to the surface of the thermoformable copolyester layer of the thermoformable laminate using a Sentinel sealer at a temperature of 160° C. for 1.0 second under a pressure of 80 psi (0.55 N/mm$^2$). Strips (25 mm wide) of the sealed capping web and thermoformable laminate are cut out at 90° to the seal, and the load required to pull the seal apart measured using an Instron operating at a crosshead speed of 0.25 m/minute. The procedure is generally repeated 5 times, and a mean value of 5 results calculated.

Heat-seal strength of the composite film to itself to itself is measured by positioning together and heating the heat-sealable layers of two samples of the film at 160° C. for 0.5 second under a pressure of 80 psi (0.55 N/mm$^2$). The sealed film is cooled to room temperature, and the sealed composite cut into 25 mm wide strips. The heat-seal strength is determined by measuring the force required under linear tension per unit width of seal to peel the layers of the film apart at a constant speed of 0.25 m/minute.

Shrinkage is measured by placing the sample in an oven at a temperature of 190° C. for 5 minutes and determining the average % shrinkage in both the machine and transverse directions, based on five film samples.

Glass transition temperature is measured by Differential Scanning calorimetry (DSC). A 10 mg polymer specimen taken from the film is dried for 12 hours under vacuum at 80° C. The dried specimen is heated at 290° C. for 2 minutes and then quenched onto a cold block. The quenched specimen is heated from 0° C. to 290° C. at a rate of 20° C./minute using a Perkin-Elmer DSC7B Differential Scanning calorimeter. The calorimeter is calibrated at a heating rate of 20° C./minute, so cooling temperatures are corrected by adding 3.9° C. to the computer-generated results.

The crystallinity percentage is measured using a Perkin Elmer DSC7B Differential Scanning calorimeter. A 5 mg sample taken from the film is heated from 0 to 300° C. at 80° C./minute, and the percent crystallinity is calculated by methods well known in the art.

Laminate Preparation and Thermoforming

A typical process for forming a laminate according to the invention is as follows. The thermoformable copolyester film and the structural film are corona-treated on the surfaces to be joined. A 1:1 mixture by volume of MOR-FREE™ 225 (polyester)/MOR-FREE™ C-33 (isocyanate) is applied by a gravure roll at room temperature at a rate of 2.0-2.5 g/m$^2$. The laminated film goes through a heated nip roll at 52-56° C. at a speed of about 500 ft/min, and the film is then rolled up and stands at room temperature for 48 h for the initial curing to take place. The film rolls are then transferred to heated room which is at 40-45° C. and kept for 5 days at which time the curing is complete. At this time the lamination bond strengths typically range from 1000 g/25 mm to destructive. Examples 1-4 describe exemplary laminates according to the invention.

A typical process of thermoforming the laminate according to the invention is as follows. The thermoformable laminate is heated and formed using a Multivac packaging machine such as a Multivac 530 which is equipped with a pear-shaped mold where the deepest point is about 4 inches. The forming temperature is set in a range from 130° C. to 215° C., and the forming time and vacuum are typically set at 2.0 seconds and 10 mbar, respectively.

Example 1

A 2-mil biaxially oriented polyester film was laminated with 4-mil DARTEK® H917 heat-stabilized nylon 6,6 film (Exopack Performance Films Inc., Whitby, Canada) using a solventless adhesive consisting of MOR-FREE™. 225 and MOR-FREE™ C-33 mixed at a 1:1 ratio at room temperature. Both films were corona treated prior to lamination. The diacid content of the polyester was 93/7 wt/wt terephthalic acid/azelaic acid, and the diol content was 95.7/4.3 wt/wt ethylene glycol/diethylene glycol. The amount of adhesive applied was 2.5 g/m$^2$. The adhesive was applied to the corona treated H917 surface and the films were laminated together at 500 ft/minute. The temperature of the nip roll was 54° C. The composite film was kept at ambient temperature for 2 days and then moved to the heated room which was at 43° C. for 5 days to complete the curing process.

Example 2

A corona-treated 2-mil polyester film having the same polyester composition as in Example 1 but with a 1.5 μm PVdC coating on the side opposite the corona treatment is laminated to a corona-treated 4-mil DARTEK® H917 heat-stabilized nylon 6,6 film. The laminating adhesive is a solventless adhesive consisting of MOR-FREE™ 225 and MOR-FREE™ C33 mixed at a 1:1 ratio at room temperature. The adhesive loading is 2.5 g/m$^2$. The adhesive is applied to the corona treated H917 surface and the PET film surface. The temperature of the nip roll is 54° C. The composite laminate is kept at ambient temperature for 2 days and then placed in a heated room at 43° C. for 5 days to complete the curing process.

Example 3

A 2-mil polyester film having the same composition as the polyester in Example 1 was laminated to 2-mil DARTEK® H917 heat-stabilized nylon 6,6 film. A process similar to that of Example 1 was followed.

Example 4

A corona-treated 2-mil PVdC coated polyester film as described in Example 2 is laminated to 2-mil DARTEK® H917 heat-stabilized nylon 6,6 film, using a process similar to that of Example 2.

Capping Webs

Examples 5-7 describe exemplary capping webs suitable for use with the thermoformable copolyester laminates of this invention.

Example 5

A 1-mil biaxially oriented PET film with an amorphous copolyester sealant layer (MYLAR® OL13, DuPont Teijin Films, Richmond, Va.) was laminated to 1-mil DARTEK® H917 heat-stabilized nylon 6,6 film. A similar process to Example 1 was followed. The non sealant side of the polyester film was corona treated and in contact with the adhesive when the laminate was formed.

Example 6

A 1-mil polyester film with an amorphous copolyester sealant layer on one side and a PVdC barrier layer on the other (Mylar® 0B13, DuPont Teijin Films, Richmond, Va.) was laminated to 1-mil DARTEK® H917 heat-stabilized nylon 6,6 film, with the barrier layer adhered to the nylon. A process similar to that of Example 2 was followed.

Example 7

A 1.2-mil polyester film having an amorphous copolyester heat-seal layer on one side (MYLAR® OL22, DuPont Teijin Films, Richmond, Va.) was laminated to 1-mil DARTEK® H917 heat-stabilized nylon 6,6 film. A process similar to that of Example 1 was followed. The non sealant side of the MYLAR® OL22 was corona treated and in contact with the adhesive when the laminate was formed.

Example 8

A thermoformable copolyester laminate made as in Example 1 was used as a formable web, and a laminate made as in Example 5 was used as the capping web, as follows. A Multivac R530 packaging machine was equipped with a pear-shaped mold where the deepest point was about 4 inches, and the form temperature was set to 160° C. The thermoformable laminate was heated and formed at the same location, using a forming time of about 2.0 seconds and a vacuum of about 10 mbar.

The cavity was then filled with product, a marinated sirloin roast having a weight of about 1 lb 12 oz, leaving about ½-1 inch head space, and the package was sealed with the capping web at 180° C. with a dwell or sealing time of about 1.0 second. A total heating seal plate was used, but in typical practice a perimeter sealing plate may be used.

Two sirloin roasts each having a weight of about 1 lb 12 oz were marinated with seasonings and vacuum packaged as described above. The meats were frozen solid, and one was removed from its package just prior to cooking. The packaged and unpackaged roasts were cooked side-by-side without thawing in a conventional oven set to 350° F. After 25 minutes in the oven, the package spontaneously opened by venting through a tiny vent and continued to cook under partial steam in a bubble with a raised top web. Elapsed times to reach 160° F. internal meat temperature were 75 and 83 minutes for the packaged and unpackaged roasts, respectively. The roast that had been cooked in the package was distinctly more juicy and moist than the unpackaged roast.

Example 9

A turkey roast having a weight of about 9 lbs was marinated with seasonings and vacuum packaged as follows. A Multivac R530 packaging machine was equipped with a pear shaped mold where the deepest point was about 4 inches, and the form temperature was set to 160° C. The laminate film of Example 1 was heated and formed at the same location, using a forming time of about 2.0 seconds and a vacuum of about 10 mbar.

The cavity was then filled with product, leaving about ½-1 inch head space, and the package was sealed with the capping web made in Example 7 at 180° C. with a dwell or sealing time of about 2.0 second. A total heating seal plate was used, but in typical practice a perimeter sealing plate may be used.

The packaged meat was placed in an Alkar™ oven set to 190° F. for six hours. The package was removed and frozen in a freezer. No venting or rupture of the seal occurred. The package was taken from the freezer and placed in a conventional oven set to 250° F. for reheat. After 30 minutes in the oven, the package spontaneously opened by venting through a tiny vent and continued to be heated under partial steam in a bubble with a raised top web for a total of 90 minutes reheat time.

Although the invention is illustrated and described herein with reference to specific embodiments, the invention is not intended to be limited to the details shown. Rather, various modifications may be made in the details within the scope and range of equivalents of the claims without departing from the invention.

What is claimed is:

1. A package comprising:
   a) a laminate thermoformed in a shape of a receptacle having a pocket with a flange and an opening, wherein the laminate consists of the following substantially coextensive layers in the following order:
      i) a self-supporting, biaxially oriented thermoformable copolyester film layer having a first surface and a second surface, said second surface constituting an outermost, exposed surface of the laminate and forming an inner surface of the pocket and a mating surface of the flange,
      wherein the copolyester in the thermoformable copolyester film layer comprises from 90 mol % to 97 mol % of at least one aromatic dicarboxylic acid and correspondingly from 10 mol % to 3 mol % of at least one aliphatic dicarboxylic acid relative to the total diacid fraction of the copolyester,
      wherein two pieces of the thermoformable copolyester film layer when heat sealed together produce a bond strength of less than 200 g/25 mm;
      ii) a laminating adhesive layer on the first surface of the thermoformable copolyester film layer;
      iii) a self-supporting, thermoformable structural film layer having a first surface and a second surface, said first surface contacting the laminating adhesive layer; and
   an optional barrier layer on a side of the structural film layer opposite the copolyester film layer;

wherein:
polyethylene terephthalate constitutes at least 80% by weight of the self-supporting biaxially oriented thermoformable copolyester film layer,
the thermoformable structural film layer comprises a polymer selected from the group consisting of polyamides, polypropylene, polyethylene, polyethylene terephthalate, ionomers, ethylene acrylic acid copolymers, ethylene vinyl acetate copolymers, polystyrene, ethylene vinyl alcohol copolymers and polyvinylidene chloride,
the laminating adhesive layer comprises a thermosetting composition,
the thermoformable copolyester film layer, the structural film layer and the laminate each shrink less than 5% in length and width upon exposure to boiling water at atmospheric pressure for five seconds; and
b) a capping web comprising a self-supporting polymeric film having on a surface thereof a substantially coextensive heat-seal layer,
wherein the opening of the receptacle is closed by the capping web such that the heat-seal layer is in contact with and bonded to the mating surface of the flange of the thermoformed receptacle,
wherein the heat-sealable layer comprises a copolyester derived from no more than 90 mol % of aromatic dicarboxylic acid and at least 10 mol % of aliphatic dicarboxylic acid, based on total diacid content of the copolyester;
wherein the package contains no other heat-sealable layer, and
wherein food contact surfaces of the laminate and the capping web, when exposed to distilled water at 250° F. (121° C.) for 2 hours, yield chloroform-soluble extractives not to exceed 0.02 mg/in$^2$ (0.0031 mg/cm$^2$) of food contact surfaces exposed to the distilled water; and that the food contact surfaces, when exposed to n-heptane at 150° F. (66° C.) for 2 hours, yield chloroform-soluble extractives not to exceed 0.02 mg/in$^2$ (0.0031 mg/cm$^2$) of food contact surfaces exposed to the n-heptane.

2. The package of claim 1, wherein the laminate is capable of forming a heat-seal bond to the capping web with a bond strength of at least 250 g/25 mm and at most 2500 g/25 mm.

3. The package of claim 1, further comprising a contained foodstuff.

4. The package of claim 1, wherein the heat-seal layer ruptures and vents the package at a temperature in a range from 150° F. (65.6° C.) to 450° F. (232.2° C.).

5. The package of claim 4, wherein the heat-seal layer ruptures and the package vents only at a temperature above 210° F. (98.9° C.).

6. The package of claim 4, wherein the heat-seal layer ruptures and the package vents only at a temperature above 250° F. (121.1° C.).

7. The package of claim 3, wherein the foodstuff is meat, poultry, or seafood.

8. The package of claim 2, wherein the capping web is heat-sealed to the exposed surface of the laminate by holding the laminate and the capping web together at 160° C. for 1.0 second under a pressure of 80 psi with the respective copolyester film layers in contact, as measured by peeling apart a 25 mm wide strip the heat-sealed structure so produced at a constant speed of 0.25 m/minute at room temperature under linear tension per unit width.

9. The package of claim 1, wherein the laminate is vacuum thermoformable.

10. The package of claim 1, wherein the structural film layer comprises a polyamide.

11. The package of claim 1, wherein the structural film layer comprises nylon 6,6.

12. The package of claim 10, wherein the barrier layer comprises a polymer selected from the group consisting of oriented polyethylene terephthalate, polyvinylidene chloride, ethylene vinyl alcohol copolymers and polyamides.

13. The package of claim 12, wherein the barrier layer comprises polyvinylidene chloride.

14. The package of claim 12, wherein the barrier layer is on the second surface of the structural film layer.

15. The package of claim 1, wherein the heat-sealable layer comprises at least one of
(i) copolyesters of azelaic acid and terephthalic acid with an aliphatic glycol;
(ii) copolyesters of adipic acid and terephthalic acid with an aliphatic glycol; and
(iii) copolyesters of sebacic acid and terephthalic acid with an aliphatic glycol,
wherein the aliphatic glycol comprises one or more of ethylene glycol, diethylene glycol, triethylene glycol, propylene glycol, 1,3-butanediol, 1,4-butanediol, 1,5-pentanediol, 2,2-dimethyl-1,3-propanediol, neopentyl glycol and 1,6-hexanediol.

16. The package of claim 1, wherein the copolyester in the thermoformable copolyester film layer comprises from 1.5 mol % to 5 mol % of diethylene glycol based on the total diol content.

17. The package of claim 1, wherein the copolyester in the thermoformable copolyester film layer comprises a copolyester of azelaic acid and terephthalic acid with ethylene glycol and diethylene glycol, wherein the diol content comprises no more than 5 mol % of diethylene glycol.

* * * * *

UNITED STATES PATENT AND TRADEMARK OFFICE
CERTIFICATE OF CORRECTION

| | |
|---|---|
| PATENT NO. | : 10,954,054 B2 |
| APPLICATION NO. | : 15/980843 |
| DATED | : March 23, 2021 |
| INVENTOR(S) | : Fenghua Deng et al. |

It is certified that error appears in the above-identified patent and that said Letters Patent is hereby corrected as shown below:

In the Claims

In Claim 1, Line 66, "an optional barrier layer" should read -- iv) an optional barrier layer --

In Claim 12, Line 21, "The package of claim 10, wherein the barrier layer" should read -- The package of claim 1, wherein the barrier layer --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*